United States Patent [19]

Glenn

[11] 4,122,312
[45] Oct. 24, 1978

[54] LOOP EXTENDER

[75] Inventor: Frederick J. Glenn, Arlington Heights, Ill.

[73] Assignee: Cook Electric Company, Morton Grove, Ill.

[21] Appl. No.: 873,849

[22] Filed: Jan. 31, 1978

Related U.S. Application Data

[63] Continuation of Ser. No. 681,232, Apr. 28, 1976, abandoned.

[51] Int. Cl.$^2$ ............................................. H04Q 1/30
[52] U.S. Cl. ................................................... 179/16 F
[58] Field of Search ......................... 179/16 EA, 16 F

[56] References Cited

U.S. PATENT DOCUMENTS

| | | | |
|---|---|---|---|
| 3,514,543 | 5/1970 | Rae | 179/16 F |
| 3,626,201 | 12/1971 | Chambers, Jr. | 179/16 F |
| 3,757,052 | 9/1973 | Tothill | 179/16 F |
| 3,763,319 | 10/1973 | Chambers, Jr. | 179/16 F |
| 3,781,480 | 12/1973 | Roge | 179/16 F |
| 3,821,483 | 6/1974 | Japenga | 179/16 F |
| 3,872,258 | 3/1975 | Chambers, Jr. | 179/16 F |
| 3,898,389 | 8/1975 | Hanneman et al. | 179/16 F |
| 3,906,162 | 9/1975 | Sparrevohn | 179/16 F |
| 3,992,591 | 11/1976 | Ingle | 179/16 F |
| 4,024,351 | 5/1977 | Ingle | 179/16 F |

*Primary Examiner*—Kathleen H. Claffy
*Assistant Examiner*—Randall P. Myers

*Attorney, Agent, or Firm*—Mason, Kolehmainen, Rathburn & Wyss

[57] ABSTRACT

A loop extender is used in conjunction with a pair of telephone lines extending from a telephone central office to a subscriber location in order to insert a booster DC potential on the telephone lines in such a manner as to aid the flow of DC current produced on the telephone lines by a telephone central office battery. A control circuit has one input terminal coupled to one of the telephone lines and a reference terminal, another input terminal coupled to the other telephone line and the reference terminal, and an output terminal coupled to a relay. Whenever the input terminals are supplied with a specified potential from the telephone lines, an output from the output terminal maintains the relay in a nonenergized condition so that contacts controlled by the relay couple a DC booster power supply in series relationship with one of the telephone lines. In response to different potentials on the input terminals, the output at the output terminal energizes the relay such that the contacts insert the DC booster power supply in series relationship with the other telephone line. The DC booster power supply has a current sensor such that the booster DC potential is only supplied to the telephone lines when DC current is present on the telephone lines. In addition, the DC booster power supply has a current limiter limiting the amount of DC current on the telephone lines.

11 Claims, 1 Drawing Figure

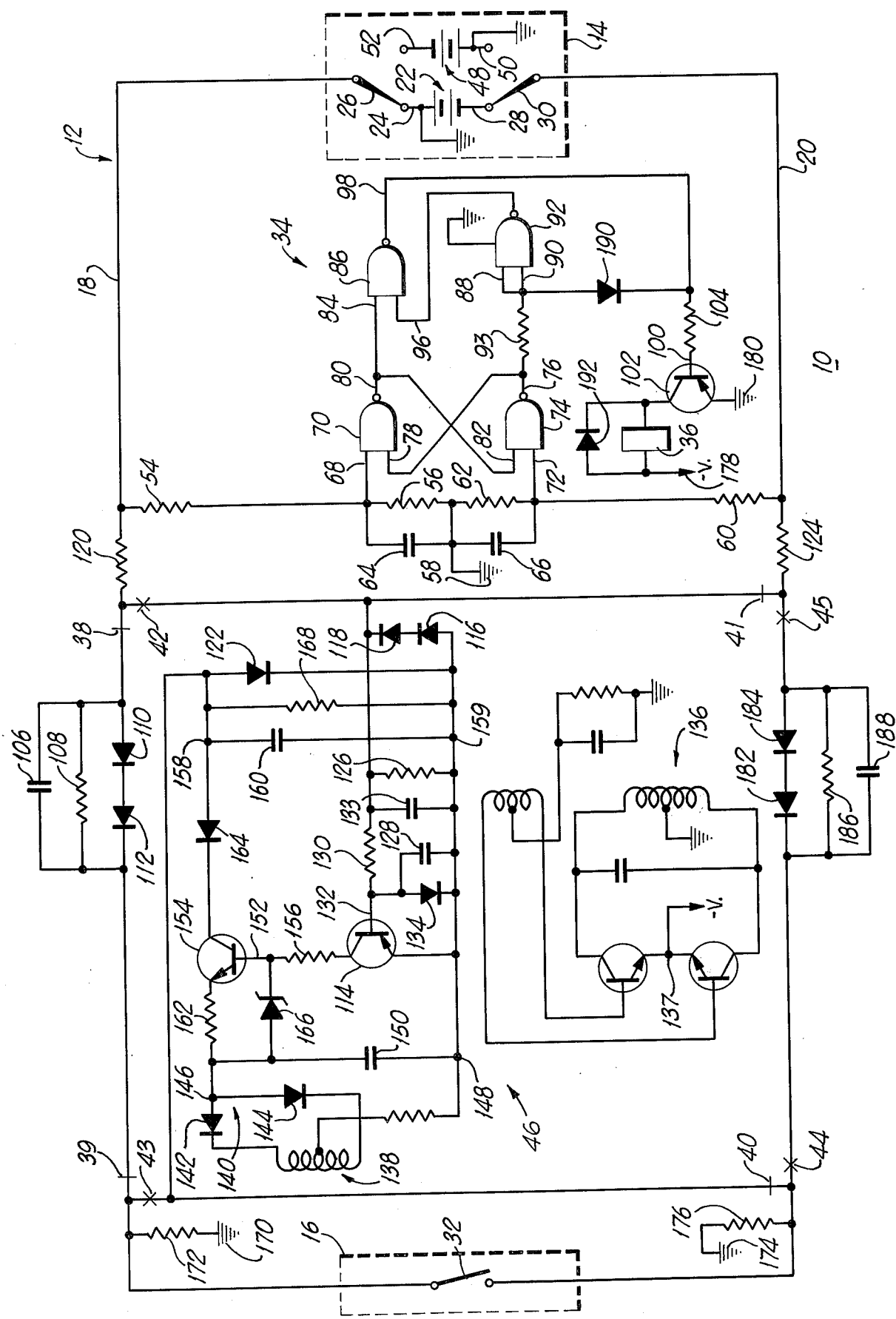

LOOP EXTENDER

The present application is a continuation application of patent application Ser. No. 681,232, filed on Apr. 28, 1976, and now abandoned.

The present invention relates to telephone equipment used with telephone subscriber loops and more particularly, to a new and improved loop extender used in effectively extending the range of a loop by inserting a DC booster power supply into a telephone loop or circuit in such a manner as to always aid the flow of loop current in the circuit.

In order to connect a telephone set or telephone sets at a remote location or station, such as a house or the like, to a telephone central office, two telephone lines (normally designated as tip and ring lines) are extended from the telephone central office to the given station. When a telephone set at a station is placed in an off-hook condition, or in other words, when the receiver is lifted by a subscriber using the telephone set, loop current flows on the tip and ring lines between the telephone central office and the telephone set due to the presence of a telephone central office battery coupled between the telephone lines. Equipment at the telephone central office detects the flow of this loop current on the telephone lines when the given telephone set is placed in an off-hook condition, and in response to the detection of the loop current, the equipment actuates other equipment so that the subscriber can complete his or her call.

The amount of loop current flowing on the telephone lines as a result of the potential supplied by the telephone central office battery is primarily dependent on the amount of accumulated resistance of the telephone lines. If the station to which the telephone lines are extended is too far away from the telephone central office, the loop current which will flow on the telephone lines may be attenuated by the accumulated resistance to a value where the telephone central office equipment will not be properly actuated and the subscriber cannot complete his or her call. For instance, dial pulses, which are caused by the interruption of loop current, may be attenuated to a point where errors will result in the call being placed by the subscriber.

In order to prevent the attenuation of the loop current to a point where the central office equipment improperly detects the loop current, the telephone wires themselves must be increased in size so as to provide less resistance for each unit length of wire, or the distance to the individual stations from central offices must be decreased by providing central offices near each of the remote stations. Alternatively, loop extenders have been devised to insert isolated DC booster power supplies in series with the telephone lines in such a manner as to aid the flow of current in the telephone loop circuit. In order to insert such DC booster power supplies into the telephone circuits, switching circuitry must be provided to switch the isolated DC power supplies in series with the telephone lines, and additionally, control circuitry must be provided to detect the polarity of the telephone central office battery so that the booster power supply is inserted in series aiding polarity with the telephone central office battery. The latter circuitry is especially critical when the telephone central office utilizes reverse battery supervision, such as reversing the polarity of the battery during conversation on the telephone lines.

There have been devised a number of loop extenders designed to insert DC booster power supplies into the telephone loop circuit in series aiding polarity with the telephone central office battery. Certain of these loop extenders insert one battery or DC power supply in series with the tip line whenever the polarity of the telephone central office battery is in one mode of operation and a different or separate battery or DC power supply in series with the ring line when the telephone central office battery is in another mode of operation. Still others of the loop extenders employ two pairs of batteries or DC booster power supplies. One of the pairs is inserted in the tip and ring lines when the telephone central office battery is in the one mode of operation and the other pair is inserted in the tip and ring lines when the telephone central office battery is in the other mode of operation.

In order to detect the mode of operation of the telephone central office battery, so that the batteries or DC booster power supplies will normally aid the flow of loop current on the telephone lines, these loop extenders have polarity sensing circuits to sense the polarity of the telephone central office battery. Some of these polarity sensing circuits sense the voltage between the tip and ring lines of the telephone circuit. Others sense the voltage not only between the telephone lines, but also from one of them, such as the tip line, to a ground reference. Yet others sense the direction of current flowing on the telephone lines.

One disadvantage of the previously described loop extenders is that they require at least two batteries or DC booster power supplies, some of them actually requiring four batteries. In addition, the loop extenders which sense the voltage between the tip and ring lines in order to determine the polarity of the central office battery tend to be susceptible to ringing signals on the telephone lines so that the booster battery or power supply is inappropriately inserted into the telephone circuit in response to ringing signals. Those extenders which utilize current sensing circuits to determine the polarity of the telephone central office battery tend to be sensitive to unwanted longitudinal induction currents which occur on the telephone lines. In order to diminish the sensitivity of these circuits to such induction currents, the speed of operation of the loop extender must be decreased.

Accordingly, objects of the present invention are to provide a new and improved loop extender used in effectively extending the range of a telephone loop between a telephone central office and a subscriber station; to provide a new and improved loop extender that utilizes a single battery or isolated DC power supply which is inserted in either the tip or ring line as a result of the polarity of a telephone central office battery; to provide a new and improved loop extender having a current sensor such that the DC booster power supply is only actuated in response to loop current on the telephone loop; to provide a new and improved loop extender having a regulated and current limited DC booster power supply; to provide a new and improved loop extender that inserts a DC power supply in series relationship with the tip or ring line in response to the DC potential detected between the tip line and a reference potential and the ring line and the reference potential; to provide a new and improved loop extender which has a control circuit to detect the DC potential on the tip and ring lines with respect to ground potential so as to insert a DC booster power supply in series aiding relationship with the telephone central office battery; and to provide a new and improved loop extender for telephone loops which is essentially immune from various conditions or potentials on the telephone lines, such as ringing signals and longitudinal induction currents, without diminishing the speed of operation of the loop extender.

In accordance with these and many other objects of the present invention, an embodiment of the present invention comprises a loop extender which is utilized with a telephone loop or circuit extending between a telephone central office and a subscriber station to effectively extend the range of the loop by inserting a DC booster power supply in the telephone loop in such a manner as to always aid the flow of loop current flowing on the telephone lines forming the telephone loop as a result of a potential supplied by a telephone central office battery. The DC power supply is inserted in series relationship with one of the telephone lines whenever a control circuit detects a specified potential or potentials on each of the telephone lines with respect to a reference potential and is inserted in series relationship with the other telephone line whenever the control circuit detects other predetermined potentials on each of the telephone lines with respect to the reference potential. The loop extender also includes a current sensor so that the DC booster power supply is only inserted on either of the telephone lines in response to loop current on the telephone lines and a limiter to limit the amount of loop current flowing on the telephone lines.

Many other objects of the present invention will become apparent from considering the following detailed description in conjunction with the drawing which is a schematic diagram of a loop extender embodying the present invention.

Referring now more specifically to the drawing, therein is disclosed a loop extender which is generally designated by the number 10 and which embodies the present invention. The loop range extender 10 is associated with a pair of telephone lines 12 extending from a telephone central office 14 to a telephone subscriber 16. The telephone lines 12 include a tip line 18 and a ring line 20 on which is normally maintained a DC potential by the telephone central office 14. The maintaining of such a DC potential on the telephone lines 12 is diagrammatically represented by a telephone central office battery 22 coupled to the telephone lines 12 with a relatively positive terminal 24, which is grounded, of the battery 22 being coupled to the tip line 18 through a switch 26 and with a relatively negative terminal 28 of the battery 22 being coupled to the ring line 20 through a switch 30.

As long as all telephone sets at the subscriber location 16 connected to the telephone lines 12 are in an on-hook condition (i.e., when the subscriber 16 is not using the telephone sets and all of the receivers are on the telephone sets), a hook switch, diagrammatically shown as a normally open switch 32, is open. With the switch 32 open, no loop current flows from the telephone central office battery 22 along the telephone lines 12. Nevertheless, a control circuit 34 forming a part of the loop extender 10 senses that the tip line 18 is at a "1" state and that the ring line 20 is at a "0" state. For the purposes of this application, a conductor is at a "1" state when it is at a potential relatively close to or at ground potential and is at a "0" state when it is at a negative potential relatively far away from ground potential. For instance, when the positive terminal 24 of the central office battery 22 is grounded, then the "1" state could be a voltage between 0 and −18 volts to ground and the "0" state could be a negative voltage greater than −18 volts to ground.

As a result, a relay 36, having normally closed contacts 38-41 and normally open contacts 42-45 and coupled to the control circuit 34, is maintained in a nonenergized state so that the contacts 38-45 are in their normally open and normally closed conditions shown in the drawing. With the contacts 38-41 closed and the contacts 42-45 open, a regulated DC booster power supply 46 is inserted in series relation with the ring line 20. The connection of the regulated DC booster power supply 46 in series relation with the ring line 20 enables the regulated DC booster power supply 46 to be in polarity aiding relationship with the telephone central office battery 22.

On the other hand, if the telephone central office 14 changes the battery polarity on the telephone lines 12, such as during normal conversation on the telephone lines 12, the tip line 18 is placed in a "0" state and the ring line 20 is placed in a "1" state. This is diagrammatically shown by a connection of another battery 48 being coupled to the telephone lines 12 through the switches 26 and 30 so that a relatively positive grounded terminal 50 of the battery 48 is coupled through the switch 30 to the ring line 20 and a relatively negative terminal 52 is coupled through the switch 26 to the tip line 18. The control circuit 34 senses the tip line 18 being at a "0" state and the ring line 20 being at a "1" state and enables the relay 36 to be energized. The contacts 38-41 become open and the contacts 42-45 become closed so that the regulated DC booster power supply 46 is inserted in series relationship with the tip line 18 and in polarity aiding relationship with the telephone central office battery 48.

Consequently, the control circuit 34 continually senses the relative potentials of the tip line 18 and the ring line 20 with respect to ground potential. In response to detecting specified potentials with respect to ground potential, the regulated DC booster power supply 46 is inserted in series relationship within either the tip line 18 or the ring line 20 so that it is in series aiding polarity relationship with the telephone central office battery 22 or 48.

More specifically, resistors 54 and 56 are coupled between the tip line 18 and a ground or reference terminal 58, and resistors 60 and 62 are coupled between the ring line 20 and the ground terminal 58. A capacitor 64 is shunted across the resistor 56 and a capacitor 66 is shunted across the resistor 62 to eliminate the effects on the control circuit 34 of any radio frequencies present on the telephone lines 12. The resistors 54 and 56 act as a voltage divider to provide an input 68 of a NAND gate 70 with a voltage indicative of the voltage of the tip line 18 with respect to ground potential at the reference terminal 58. Similarly, the resistors 60 and 62 act as a voltage divider to provide an input 72 of a NAND gate 74 with a voltage indicative of the voltage on the ring line 20 with respect to ground potential.

When the input terminal 68 is at a "1" state and the input terminal 72 is at a "0" state, such as when the telephone central office battery 22 is coupled to the telephone lines 12, an output 76 of the NAND gate 74 and another input 78 of the NAND gate 70 are placed in a "1" state. With both the inputs 68 and 78 of the NAND gate 70 in a "1" state, an output 80 of the NAND gate 70 and another input 82 of the NAND gate 74 are placed in a "0" state.

As a result, an input 84 of a NAND gate 86 in the control circuit 34 is also at a "0" state and shorted inputs 88 and 90 of a NAND gate 92 are placed in a "1" state through a resistor 93. With the inputs 88 and 90 in a "1" state, an output 94 of the NAND gate 92 is placed in a "0" state so that both the inputs 84 and 96 of the NAND gate 86 are in a "0" state. Consequently, an output 98 of the NAND gate 86 is placed into a "1" state. Since the output 98 is coupled to a base electrode 100 of a transistor 102 by a resistor 104, the "1" state of the output 98 maintains the transistor 102 in a normally nonconductive state such that the relay 36 is not energized. As long as the relay 36 is not energized, the normally closed contacts 38-41 are maintained closed and the normally open contacts 42-45 remain in an open condition. Thus, the DC booster power supply 46 is in series relation with the ring line 20.

More specifically, with the contacts 38 and 39 closed, a parallel combination of a capacitor 106, a resistor 108, and a pair of diodes 110 and 112 are inserted in series relationship with the tip line 18. Although the DC booster power supply 46 is maintained in series relation with the ring line 20 through the closed contacts 40 and 41, the DC booster power supply 46 does not add to the DC potential on the ring line 20 as long as no loop current is flowing on the telephone lines 12. As will be explained in further detail hereinafter, this is primarily because a normally nonconductive transistor 114 maintains the DC booster power supply 46 in an inactive or idle state as long as no loop current flows through diodes 116 and 118.

As previously indicated and as long as the subscriber 16 has not placed any telephone sets in an off-hook condition, the switch 32 will remain open and no loop current will flow on the telephone lines 12. However, when the subscriber 16 places any telephone set connected to the telephone lines 12 in an off-hook condition, the hook switch 32 will change to a closed condition. A loop is thereby formed via the pair of telephone lines 12 between the positive terminal 24 of the battery 22 and the negative terminal 28 of the battery 22. Loop current then flows from the positive battery terminal 24 through the switch 26, the tip line 18, a resistor 120, the closed contact 38, the parallel combination including the capacitor 106, the resistor 108 and the diodes 110 and 112, the closed contact 39, the closed subscriber hook switch 32, the closed contact 40, a diode 122 in the DC booster power supply 46, the diodes 116 and 118, the closed contact 41, a resistor 124, the ring line 20, and the switch 30 to the negative terminal 28 of the telephone central office battery 22. Since this loop current does not affect the relative potential of the tip line 18 with respect to the ground potential at terminal 58, or the potential of the ring line 20 with respect to ground potential at the terminal 58, the control circuit 34 remains as it was before the loop current was flowing on the telephone lines 12 so that the transistor 102 is maintained nonconductive and the relay 36 is not energized.

With loop current flowing as described through the diodes 116 and 118, and although the diodes 116 and 118 are each forward biased and are therefore relatively conductive, there is a sufficient voltage drop across each of these diodes 116 and 118 such that a potential is established across a resistor 126. The potential is such that a capacitor 128 is charged relatively quickly through a resistor 130. The capacitor 128 generally acts as a time delay for rendering the transistor 114 conductive because a relatively negative potential is supplied to a base electrode 132 of the transistor 114 when the capacitor 128 is sufficiently charged. A capacitor 133 is coupled across the resistor 126 to filter any detrimental voltages, such as longitudinal voltages, that might be present on the telephone lines 12 and that might interfere with the operation of the transistor 114 in response to loop current. A diode 134 is coupled across the capacitor 128 to protect the transistor 114 from transients or the like on the telephone lines 12.

It should be noted that the parallel combination of the diodes 116 and 118, the resistor 126 and the capacitor 133 are essentially in series relationship with the ring line 20. However, the impedance of this combination is offset or balanced on the tip line 18 by having the parallel combination of the diodes 110 and 112, the resistor 108 and the capacitor 106 in series with the tip line 18. In this manner, the tip line 18 and the ring line 20 maintain their normal balanced impedance configuration.

The source of DC potential for the DC booster power supply 46 is an oscillator 136. The oscillator 136 is a standard oscillator which converts the DC potential at terminal 137 to an AC potential appearing across windings 138. This AC potential is converted to a DC potential by a full wave rectifier 140 consisting of diodes 142 and 144. The full wave rectifier 140 enables a relatively negative potential to be supplied to a terminal 146 and a relatively positive potential to a terminal 148 such that the DC potential across a capacitor 150 is an isolated source of DC potential for the DC booster power supply 46.

When the transistor 114 is rendered conductive, the relatively positive potential from the terminal 148 is coupled to a base electrode 152 of a transistor 154 through a resistor 156 and the relatively conductive transistor 114. As a result, the transistor 154 also is rendered somewhat conductive such that a negative potential at the terminal 146 is supplied to a terminal 158 on one side of an output capacitor 160 through the conductive transistor 154, a resistor 162 and a diode 164. The other side 159 of the capacitor 160 is coupled to the positive terminal 148. In this manner, the capacitor 160 acts as a booster battery or potential source to aid or assist the telephone central office battery 22 in producing a loop current along the telephone lines 12 because the loop current flows through the booster supply 46 since the diode 122 is now reversed biased.

Normally, the telephone lines 12, with which the loop extender 10 is utilized, has sufficient resistance to maintain the loop current flowing on the telephone lines 12 due to the telephone central office battery 22 and the DC booster supply 46 at a reasonable level. However, when the loop resistance on the telephone lines 12 falls below a specified resistance level, such as 1,000 ohms, the loop current on the telephone lines 12 tends to increase beyond a preferred level. Advantageously, a Zener diode 166 is coupled between the base electrode 152 of the transistor 154 and the relatively negative terminal 146 at the output of the full wave rectifier 140. The Zener diode 166, along with the resistor 162, acts as a current limiter for current on the telephone lines 12 to maintain the transistor 154 somewhat conductive when the transistor 114 is conductive.

More specifically, the current flowing through the resistor 162, the somewhat conductive transistor 154, and the diode 164 is proportional to the current flowing in the telephone line 12. As the current increases, the voltage drop across the resistor 162 also increases so that by means of the Zener diode 166 the current to the base electrode 152 is reduced and the transistor 154 becomes less conductive and decreases the amount of current flowing through its collector-emitter circuit. Consequently, the resistor 162 provides negative feedback to the transistor 154 so that the current through the collector-emitter circuit of the transistor 154, and thus on the telephone lines 12, is essentially constant over a wide range of loads caused by the loop resistance of the telephone lines 12.

As long as the loop current is flowing on the telephone line 12, the transistor 154 will remain somewhat conductive such that the capacitor 160 will be inserted in series with the ring line 20 to assist or aid the loop current flowing along the telephone lines 12. As long as this loop current is flowing through the diodes 116 and 118, the transistor 114 will remain conductive such that the transistor 154 will also remain somewhat conductive and the DC potential from the full wave rectifier 140 will be supplied to the capacitor 160.

However, when loop current ceases to be present on the telephone lines 12, such as when the hook switch 32 at the subscriber station 16 is open, there will be no potential across the diodes 116 and 118 and the transistor 114 will revert to its normally nonconductive state because the base electrode 132 will no longer be supplied with a relatively negative biasing potential. When the transistor 114 reverts to its nonconductive state, the base electrode 152 of the transistor 154 will no longer be supplied with a relatively positive potential through the transistor 114 and the resistor 156. As a result, the transistor 154 will also revert to its normal nonconductive state. With the transistor 154 in its nonconductive state, the DC potential from the full wave rectifier 140 no longer is supplied to the capacitor 160 and the capacitor 160 discharges through the resistor 168.

During dialing, the subscriber 16 is in essence opening and closing the hook switch 32 to briefly interrupt the flow of loop current on the telephone lines 12. When the loop current is briefly interrupted in dialing, the transistor 114 will generally be rendered nonconductive in response to the lack of loop current flowing through the diodes 116 and 118. The transistor 154 will also be cut off or rendered nonconductive. However, the boosting potential at the capacitor 160 for the DC booster power supply 46 will still assist the loop current flowing on the telephone lines 12 when the hook switch 32 is again closed because the interruption of loop current during dialing is not long enough for the capacitor 160 to discharge through the resistor 168. Accordingly, when the transistor 114 and the transistor 154 again are rendered conductive in response to loop current in the dialing process, the capacitor 160 will be quickly charged to assist in the flow of loop current on the telephone lines 12.

The foregoing discussion of the operation of the loop extender 10 dealt with the condition on the telephone lines 12 wherein the tip line 18 was in a "1" state with respect to ground and the ring line 20 was in a "0" state with respect to ground at the terminal 58. The voltages with respect to ground of the tip line 18 and the ring line 20 changes depending on the operation occurring on the telephone lines 12 and depending on the potentials on the lines 12 from ringing voltages or induction currents. However, as will be discussed hereinafter, the control circuit 34 enables the DC booster power supply 46 to always be inserted in series with the tip line 18 or the ring line 20 in such a manner as to always assist the telephone central office battery 22 or 48, and not to be affected as a result of such ringing voltages or induction currents.

More specifically, and as previously indicated, when the tip line 18 is in a "1" state with respect to ground potential at the terminal 58 and the ring line 20 is in a "0" state with respect to ground potential at the terminal 58, the output 98 of the NAND gate 86 is in a "1" state, such that the transistor 102 is in a nonconductive condition. As a result, the relay 36 is not energized and the DC booster power supply 46 is inserted in series relation with the ring line 20 to assist the telephone central office battery 22.

Sometimes the telephone central office 14 essentially disconnects the battery 22 or 48 from the telephone lines 12. This may occur when the telephone central office 14 receives dialing pulses from the subscriber 16 and is switching the telephone lines 12 to a conversation path circuit. During the short interim of switching to the conversation path circuit, the telephone lines 12 would be floating or not at any fixed potential if it were not for a ground terminal 170 being coupled to the tip line 18 through a resistor 172 and for a ground terminal 174 being coupled to the ring line 20 through a resistor 176. The ground terminals 170 and 174 can be the same ground terminal or connection as the ground terminal 58. In this manner, the tip line 18 and the ring line 20 are maintained in a "1" state.

Even though the input 72 of the NAND gate 74 is now in a "1" state, the output 76 remains in a "1" state because the input 82 of the NAND gate 74 is in a "0" state. Since the output 76 is coupled to the input 78 of the NAND gate 70, both of the inputs 68 and 78 of the NAND gate 70 are in a "1" state so that the output 80 of the NAND gate 70 remains in a "0" state. Since the output 80 of the NAND gate 70 and the output 76 of the NAND gate 74 have remained in the same states, the output 98 of the NAND gate 86 remains in a "1" state. The relay 36 is not energized and the DC booster power supply 46 remains inserted in series relation with the ring line 20.

When the central office battery 22 is again coupled to the telephone lines 12, the tip line 18 again is put in a "1" state so that the input 68 of the NAND gate 70 remains in a "1" state. However, since the ring line 20 is now in a "0" state with respect to ground potential at the terminal 58, the input 72 of the NAND gate 74 reverts to a "0" state. When the inputs 68 and 72 are in this state, the output 80 of the NAND gate 70 remains in a "0" state and the output 76 of the NAND gate 74 remains in a "1" state such that the output 98 of the NAND gate 86 remains in its "1" state and the relay 36 is not energized. As a result, the DC booster power supply 46 is in series relation with the ring line 20 to assist the central office battery 22.

In certain telephone central office operations, such as in certain two party line identification systems, the tip line 18 and a ring line 20 may both be coupled to a negative battery terminal or placed in a "0" state. During such an operation, the input 68 to the NAND gate 70 is placed in a "0" state and the input 72 of the NAND gate 74 is placed in a "0" state. Consequently, the output 80 of the NAND gate 70 changes from a "0" state to a "1" state. However, since the input 72 of the NAND gate 74 is at a "0" state, the output 76 of the NAND gate 74 remains in a "1" state. With the output 76 in a "1" state, the shorted inputs 88 and 90 of the NAND gate 92 remain in a "1" state so that the input 96 of the NAND gate 86 remains in a "0" state. With the input 96 in a "0" state, and even though the input 84 of the NAND gate 86 is now in a "1" state, he output 98 of the NAND gate 86 remains in a "1" state such that the relay 36 is not energized and is therefore not effected by the coupling of both the telephone lines 12 to a "0" voltage.

On the other hand, when the telephone central office couples the battery 48 to the tip line 18 and the ring line 20 through the switches 26 and 30, respectively, the control circuit 34 senses this change in potential on the telephone lines 12 and energizes relay 36 so that the DC booster power supply 46 aids the battery 48. More specifically, when the battery 48 is coupled to the telephone lines 12, the input 68 is placed in a "0" state with respect to ground potential and the input 72 is placed in a "1" state. With the input 68 in a "0" state, the output 80 of the NAND gate 70 is in a "1" state. As a result, both of the inputs 72 and 82 of the NAND gate 74 are in a "1" state and the output 76 of the NAND gate 74 is placed into a "0" state. This "0" state is coupled to the inputs 88 and 90 of the NAND gate 92 through the resistor 93 and the output 94 of the NAND gate 92 and thereby the input 96 of the NAND gate 86 are changed to a "1" state. Since both of the inputs 84 and 96 of the NAND gate 86 are in a "1" state, the output 98 of the NAND gate 86 is changed to a "0" state.

With the output 98 of the NAND gate 86 in a "0" state, a relatively negative potential is supplied to the base electrode 100 of the transistor 102 through the resistor 104. The transistor 102 now becomes conductive such that an energizing path is formed from a negative DC potential source terminal 178 through the relay 36 and the conductive transistor 102 to a ground terminal 180 and the relay 36 is energized. As a result of the relay 36 being energized, the contacts 38 and 39 are open and the contacts 44 and 45 are closed. In this manner, the parallel combination of diodes 182 and 184, a resistor 186 and a capacitor 188 are inserted in series relation with the ring line 20. At the same time, the contacts 42 and 43 are closed and the contacts 40 and 41 are open. As a result, the DC booster power supply 46 is inserted in series relation with the tip line 18.

When the hook switch 32 closes in response to the subscriber 16 placing a telephone set in an off-hook condition, loop current will flow from the positive terminal 50 of the battery 48 through the switch 30, the ring line 20 including the resistor 124, the closed contact 45, the parallel combination of the diodes 182 and 184, the resistor 186 and the capacitor 188, the closed contact 44, the hook switch 32, the closed contact 43, the diodes 122, 116 and 118 in the DC booster power supply 46, the closed contact 42, the resistor 120 and the tip line 18 to the relatively positive terminal 52 of the battery 48. As was previously described, the loop current flowing through the diodes 116 and 118 enables DC potential from the full wave rectifier 140 to be supplied to the capacitor 160 such that the terminal 158 is relatively negative and the terminal 165 is relatively positive. This potential across the capacitor 160 will assist the current flowing along the telephone lines 12 because it is now in series relationship with the tip line 18. Once again, the effect of the parallel combination of the diodes 116 and 118, the resistor 126 and the capacitor 133 being inserted in series relation with the tip line 18 is offset or balanced by the parallel combination of the diodes 182 and 184, the resistor 186 and the capacitor 188 inserted in series relation with the ring line 20.

The DC booster power supply 46 is then in series relation with the tip line 18 to assist the flow of current along the telephone lines 12 in much the same manner as the DC booster power supply 46 was inserted in series relationship with the ring line 20 when the telephone central office battery 22 was coupled to the telephone lines 12.

In the event that both sides of the telephone lines 12 are coupled to a negative potential or placed in a "0" state, the relay 36 will remain energized to maintain the DC booster power supply 46 in series with the tip line 18. In such an event, the input terminal 72 and the input 68 both are in a "0" state. With the input 72 in a "0" state, the output 76 of the NAND gate 74 reverts to a "1" state. However, the output 80 of the NAND gate 70 remains in a "1" state because the input 68 remains in a "0" state. Normally, the fact that the output 76 is placed in a "1" state would cause the shorted inputs 88 and 90 to also be placed into a "1" state. However, coupled between the shorted inputs 88 and 90 and the output 98 of the NAND gate 86 is a diode 190. The output 98 at this point in time is in a "0" state, and because of the voltage drop across the resistor 93, the shorted input terminals 88 and 90 are in a relatively positive state so that the diode 190 is conductive and clamps the shorted inputs 88 and 90 of the NAND gate 92 to the "0" state level of the output 98 of the NAND gate 86. With the shorted input terminals at a "0" state, the output 94 of the NAND gate 92 and the input 96 of the NAND gate 86 are in a "1" state. Since both of the inputs 84 and 96 are in a "1" state, the output 98 of the NAND gate 86 remains in a "0" state so that the relay 36 remains energized through the conductive transistor 102.

Once the central office battery 48 is again coupled to the telephone lines 12, the input 68 of the NAND gate 70 will remain in a "0" state, but the input 72 of the NAND gate 74 will change to a "1" state. The output 80 of the NAND gate 70 will remain in a "1" state such that both of the inputs 72 and 82 of the NAND gate 74 will be in a "1" state causing the output 76 of the NAND gate 74 to change to a "0" state. At the same time, the shorted input terminals 88 and 90 are in a "0" state so that the output 94 and the input 96 are placed in a "1" state. With the input terminals 84 and 96 at a "1" state, the output 98 of the NAND gate 86 remains in a "0" state so that the relay 36 remains energized. In this manner, as soon as the central office battery 48 is coupled to the telephone lines 12, the DC booster power supply 46 will be available to aid the central office battery 48 in producing an appropriate loop current when the hook switch 32 is closed.

As was the case with respect to the central office battery 22, there are times that the battery 48 is disconnected from the telephone lines 12 so that the tip line 18 is placed in a "1" state because of the coupling of the ground terminal 170 through the resistor 172 to the tip line 18, and the ring line 20 is in a "1" state because of the coupling of the ground terminal 174 through the resistor 176 to the ring line 20. When the tip line 18 and the ring line 20 are placed in this "1" state, the inputs 68 and 72 are likewise converted to a "1" state. Since the input terminal 78 is at a "0" state, the output 80 of the NAND gate 70 remains in a "1" state as does the input 82 of the NAND gate 74. With the inputs 82 and 72 of the NAND gate 74 in a "1" state, the output 76 of the NAND gate 74 remains in a "0" state. Since the outputs 80 and 76 remain in the same state as they were before the central office battery was disconnected from the lines 12, the output 98 remains in its "0" state such that the transistor 102 is maintained conductive to provide an energization path for the relay 36.

If the central office battery 22 is then coupled to the telephone lines 12, the input 68 will remain in a "1" state, but the input 72 will be converted to a "0" state. Since the input 72 is at a "0" state, the output 76 and the input 78 will be placed into a "1" state, so that both input terminals 68 and 78 of the NAND gate 70 are in a "1" state. The output 80 of the NAND gate 70 then is placed in a "0" state as will the input 84 of the NAND gate 86. With the input 84 of the NAND gate 86 in a "0" state, the output 98 will revert to a "1" state so that the base electrode 100 of the transistor 102 will no longer receive a relatively negative biasing potential. The transistor 102 will be rendered nonconductive so that the relay 36 will no longer be provided with an energization path. The relay 36 is then deenergized by allowing current to flow through a diode 192. When the relay 36 is deenergized, the contacts 38-41 change to their normally closed condition and the contacts 42-45 revert to their normally open condition. In this manner, the DC booster power supply 46 is placed in series relation with the ring line 20 so as to assist the central office battery 22 in the matter previously described.

From the foregoing description of the various voltages on the tip line 18 and the ring line 20 with respect to ground at the terminal 58, the following "Truth" table can be formulated with respect to the voltages on the tip line 18 with respect to ground, the voltages on the ring line 20 with respect to ground, and the state of the output 98 of the NAND gate 86:

| Voltage Tip Line 18 to Ground | Voltage Ring Line 20 to Ground | Output 98 of NAND gate 86 |
|---|---|---|
| 1 | 0 | 1 |
| 1 | 1 | 1 |
| 1 | 0 | 1 |
| 0 | 0 | 1 |
| 0 | 1 | 0 |
| 0 | 0 | 0 |
| 0 | 1 | 0 |
| 1 | 1 | 0 |
| 1 | 0 | 1 |

It should be noted with respect to the above table that the state of the output 98 is not only dependent on the voltage of the tip line 18 with respect to ground and the voltage of the ring line 20 with respect to ground at any given time, but also the previous conditions or states of those lines with respect to ground. In other words, the sequence set forth in the above table is important in determining the state of the output 98.

As is evident from the foregoing table and discussion, whenever the output 98 is in a "1" state, the relay 36 is not energized so that the DC booster power supply 46 is in series relation with the ring line 20. In those instances wherein the output 98 is in a "0" state, the transistor 102 is rendered conductive such that the relay 36 is energized. In that event, the DC booster power supply 46 is in series relation with the tip line 18 to assist the central office battery 48.

Since the control circuitry 34 senses voltages of the tip line 18 and the ring line 20 with respect to the ground terminal 58 and both of these voltages must be in a specified state before the output 98 of the NAND gate 86 is affected, the loop extender 10 is effectively immune from ringing voltages or induction currents that occur on the telephone lines 12. In addition, only a single source of DC potential is required for the loop extender 10 whereas many previous loop extenders required at least two, if not four, sources of DC potential. Notwithstanding the fact that there is only one DC booster power supply 46 used in connection with the loop extender 10, this supply is inserted in series relation with the tip line 18 or the ring line 20 in such a manner as to always assist the flow of loop current caused by the central office battery 22 or the central office battery 48. Moreover, and as previously described, the DC booster power supply 46 limits the amount of current that will flow on the telephone lines 12.

Although the present invention is described with reference to one illustrative embodiment thereof, it should be understood that numerous other modifications and embodiments of the invention can be devised by those skilled in the art that will fall within the spirit and scope of the principles of this invention.

I claim:

1. A loop extender for a pair of telephone lines extending from a telephone central office having a central office DC power supply adapted to be connected to said telephone lines with at least first and second modes, said telephone lines having thereon a plurality of DC potential states including at least first and second DC potential states indicative of said first and second modes of said central office DC power supply, said loop extender comprising:

a control circuit means coupled to said telephone lines so as to continuously monitor the DC potential states of said telephone lines to detect changes in said DC potential states, said control circuit means having a first output whenever said first DC potential state is detected on said telephone lines and maintaining said first output until said second DC potential state is detected on said telephone lines, at which time said control circuit means has a second output which is maintained by said control circuit means until said first DC potential state is detected on said telephone lines, a DC booster power supply having a source of DC potential, and a switching means controlled by said first and second outputs of said control circuit means and coupling said DC booster power supply into one of said telephone lines in response to said first output and into the other of said telephone lines in response to said second output such that said DC booster power supply is maintained in series aiding polarity with said central office DC power supply.

2. The loop extender as set forth in claim 1 wherein said DC booster power supply is normally in an idle condition such that no DC potential is supplied to the telephone lines from said DC booster power supply and said DC booster power supply has current sensing means to sense the presence of DC current on said telephone lines and to render said DC booster power supply active so as to supply said DC potential to said telephone lines.

3. The loop extender as set forth in claim 1 wherein said DC booster power supply has a current limiter means to limit the amount of DC current flowing on said telephone lines.

4. The loop extender as set forth in claim 1 wherein said switching means includes a set of normally open contacts, a set of normally closed contacts, and a relay controlling said contacts.

5. A loop extender used in effectively extending the range of first and second telephone lines extending from a telephone central office having a central office DC power supply adapted to be coupled to said first and second telephone lines with at least first and second modes of operation, said first and second telephone lines having thereon a plurality of DC potential conditions including at least first and second DC potential conditions indicative of said first and second modes of operation, said loop extender comprising:

a control circuit means coupled to said first and second telephone lines so as to monitor the DC potential conditions of said first and second telephone lines, said control circuit means having a first output whenever said first DC potential condition is detected on said first and second telephone lines and maintaining said first output until said second DC potential condition is detected on said first and second telephone lines at which time said control circuit means has a second output, a DC booster power means having an effective impedance, a switching means coupled to said control circuit means and being responsive to said first and second outputs, said switching means coupling said DC booster power means in a series relationship with said first telephone line when said control circuit means has said first output and said switching means coupling said DC booster power means to said second telephone line when said control circuit means has said second output, and impedance means being coupled to said second telephone line by said switching means when said switching means couples said DC booster power means to said first telephone line and being coupled to said first telephone line when said switching means couples said DC booster power means to said second telephone line, said impedance means having an impedance substantially equal to said effective impedance of said DC booster power means.

6. The loop extender as set forth in claim 5 wherein said DC booster power means is an isolated power supply.

7. The loop extender as set forth in claim 5 wherein said DC booster power means includes an oscillator to produce an AC potential, a rectifier means to convert said AC potential to a DC potential and sensing means to supply said DC potential to the first telephone line when said DC booster power means is coupled to said first telephone line and when DC current is present on said first telephone line and to supply said DC potential to the second telephone line when said DC booster power means is coupled to said second telephone line and when DC current is present on said second telephone line.

8. The loop extender as set forth in claim 5 wherein said DC booster power means includes current sensing means to sense DC current on the first telephone line when said DC booster power means is coupled to said first telephone line and to sense DC current on the second telephone line when said DC booster power means is coupled to said second telephone line, said current sensing means normally maintaining said DC booster power means in an inactive state such that said DC booster power means does not apply a DC potential to the first and second telephone lines and actuating said DC booster power means to supply said DC potential to said first telephone line whenever said current sensing means senses a DC current on said first telephone line and actuating said DC booster power means to supply said DC potential to said second telephone line whenever said current sensing means senses a DC current on said second telephone line.

9. The loop extender as set forth in claim 5 wherein said impedance means includes first and second impedance means, said first impedance means being coupled to said second telephone line by said switching means when said switching means couples said DC booster power means to said first telephone line and said second impedance means being coupled to said first telephone line when said switching means couples said DC booster power means to said second telephone line.

10. A loop extender for use with first and second telephone lines having a plurality of DC potential states with at least a first condition when said first telephone line has a DC potential that is relatively positive with respect to the DC potential on said second telephone line, and a second condition when said second telephone line has a DC potential that is relatively positive with respect to the DC potential on said first telephone line, said loop extender comprising:

a control circuit means coupled to said first and second telephone lines so as to continuously monitor the DC potential states of said first and second telephone lines to detect changes in said DC potential states, said control circuit means having a first output whenever said first condition is detected on said first and second telephone lines and maintaining said first output until said second condition is detected on said first and second telephone lines at which time said control circuit means has a second output, a DC booster power means, and a switching means coupled to said control circuit means and being responsive to said first and second outputs, said switching means coupling said DC booster power means to said first and second telephone lines so as to be in series aiding polarity relationship with said first condition of said first and second telephone lines when said control circuit has said first output and coupling said DC booster power means to said first and second telephone lines so as to be in series aiding relationship with said second condition when said control circuit has said second output.

11. The loop extender as set forth in claim 10 wherein said DC booster power means has current limiting means such that the DC booster power means limits the amount of DC current on said first and second telephone lines.

* * * * *